June 26, 1962
C. A. FORD
3,040,370
CASTOR WHEELS
Filed April 26, 1960
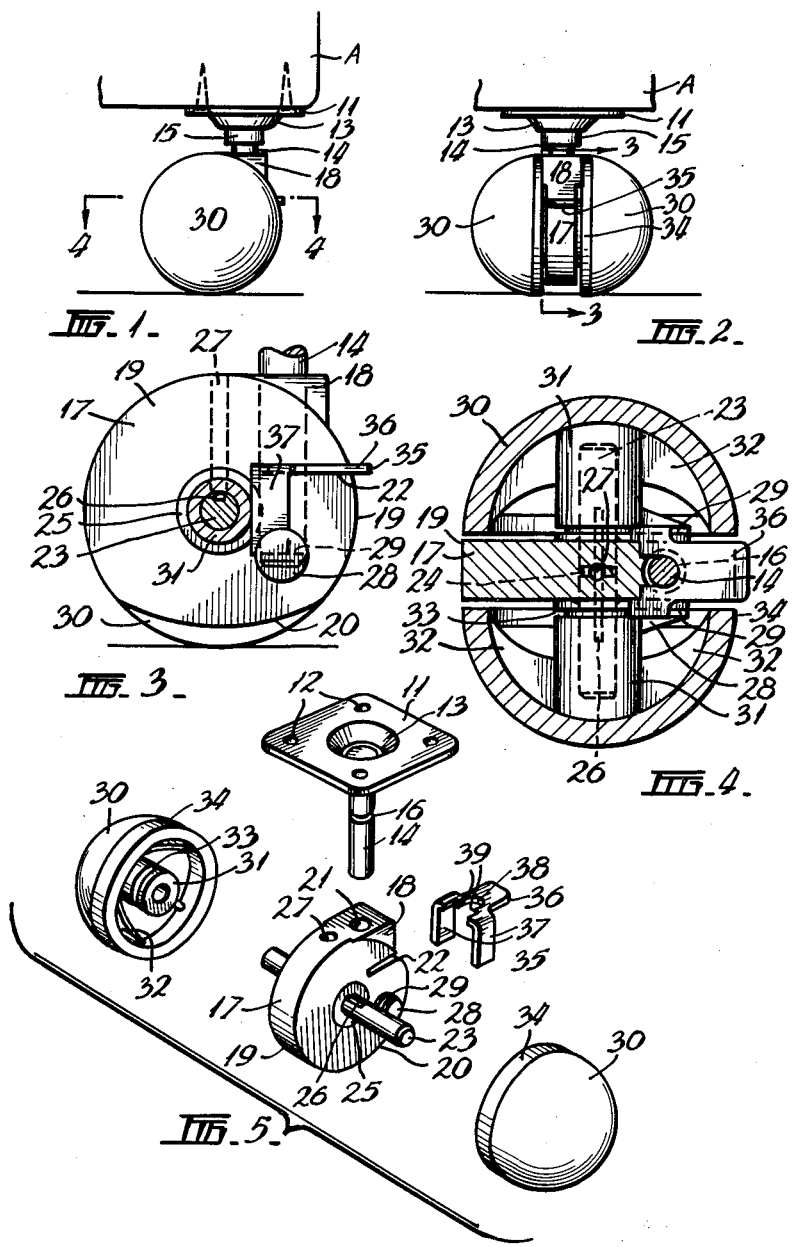
INVENTOR:
Clarence Andrew Ford
BY Dawson, Tilton, Fallon & Lungmus
ATTORNEYS

United States Patent Office 3,040,370
Patented June 26, 1962

3,040,370
CASTOR WHEELS
Clarence Andrew Ford, Box Hill, near Melbourne, Victoria, Australia, assignor of one-half to John Brent & Co. Proprietary Limited, Carlton, near Melbourne, Victoria, Australia
Filed Apr. 26, 1960, Ser. No. 24,773
Claims priority, application Australia Apr. 27, 1959
7 Claims. (Cl. 16—31)

This invention relates to improvements in castor wheels and it refers particularly to castors for articles of furniture and the like—such as lounge chairs, television receivers and auto-trays.

An object of the invention is to provide a castor which, when fitted to an article of furniture, will freely follow any movement of the article of furniture so as to provide for a relatively easy movement of the article of furniture over the surface of the floor. A further object of the invention is to provide a castor which will provide a somewhat larger bearing surface than has been provided by conventional castors. Yet another object of the invention is to provide a castor for articles of furniture and the like which will be relatively economical to manufacture, easy to assemble and which will have a relatively long life in use.

According to one aspect of the invention there is provided a castor having a body member, means for mounting the body member on an article of furniture for pivotal castor-like movement relative thereto, a transverse axle carried by the body member rearwardly of the mounting means, two castor wheels mounted rotatably on the transverse axle, and means holding the castor wheels against lateral displacement on the transverse axle.

In a further aspect there is a castor having an upright axle whereon a body member is mounted for pivotal movement, said body member having a transverse axle extending on the opposite sides thereof, castor wheels mounted on the transverse axle on opposite sides of the body member, and means for locking the castor wheels relative to the body member so as to permit free rotation of the wheels relative to the body member but prevent disengagement of the rotatable parts from the body member. It is preferred that the upright axle be connected detachably to the body member at a location a short distance forwardly of the transverse axle so that as the castor is moved over the surface whereon it is resting the castor wheels mounted on the transverse axle will follow the upright axle very readily so as to provide for a smooth movement. As there are provided two castor wheels, on opposite sides of the body member and, therefore, on opposite sides of the upright axle, there will be effected a differential movement as the castor is turned about the upright axle. This provides for an extremely smooth turning movement of the castor. Also, the twin castor wheels provide for a relatively large bearing surface and, as the axle for connecting the body member to the article of furniture is upright, there will be a relatively light loading of that axle as compared with that applied to an inclined axle.

In another aspect of the invention there is a body member having a transverse axle extending on opposite sides of the body member, an upright opening in the body member forwardly of the transverse axle, an upright axle mounted pivotally in the upright opening, two castor wheels on the transverse axle, and means for locking the upright axle and the castor wheels in position relative to the body member in such manner that said upright axle and said castor wheels may turn freely relatively to the body member.

In yet another aspect the castor has a body member, a transverse axle extending on opposite sides of the body member, at least two castor wheels on the transverse axle in opposite sides of the body member, a mounting member, means for connecting the body member to the mounting member so that the body member is freely rotatable relative to the mounting member, and means for releasably locking the castor wheels on the transverse axle.

In order that the invention may be readily understood and conveniently put into practical form I shall now describe, with reference to the accompanying illustrative drawings, a preferred construction of castor made according to the invention. In these drawings:

FIG. 1 shows a side view of the improved castor, made according to the invention, as fitted to an article of furniture;

FIG. 2 is a front view of the castor;

FIG. 3 shows a vertical cross-section on the line and in the direction of the arrows 3—3 of FIG. 2;

FIG. 4 shows a horizontal cross-section on the line and in the direction of the arrows 4—4 of FIG. 1; and FIG. 5 is an exploded perspective view showing the several parts ready to be assembled together.

FIGS. 3 and 4 are on larger scale than the FIGS. 1, 2 and 5.

The castor illustrated in these drawings has a mounting plate 11 of substantially square shape having a number of holes 12 for the reception of fastenings—as screws or bolts—by means of which the mounting plate 11 may be readily secured to an article of furniture—indicated in FIGS. 1 and 2 by the reference A—and having at about the middle thereof a downwardly recessed or concaved portion 13. The vertical or upright axle 14 of the castor has an integral collar 15 a short distance below its upper end and said upper end is fastened to that concaved portion 13. Said axle 14 has a circumferential groove 16 at about the middle of its length. The lower end of the axle 14 is chamfered—to facilitate the fitting of the axle to the body member of the castor.

The body member 17 of the castor is in the form of a relatively thick parallel-sided plate of substantially uniform thickness for the main part, having a square corner portion 18 of slightly greater thickness than the remainder of the body member at the upper front part thereof. The edge of the body member—except for the corner portion 18—is of curved shape, the front and rear edge portions 19 being of arcuate shape with a common centre and the same radius and the lower or underneath edge portion 20 being of greater radius so as to present a somewhat flattened appearance. The shape of the body member is depicted particularly in FIGS. 3 and 5.

A cylindrical hole 21 is provided in the front portion of the body member 17, extending downwardly through the square corner portion 18 and past the centre of the body member. That hole 21 is of such a size as to be adapted to accommodate the upright axle 14, and when the castor is in normal operating position the hole is upright or substantially vertical. A transverse slot 22 is formed in the front portion of the body member, said slot intersecting the hole 21 at a location corresponding to the circumferential groove 16 of the axle 14 when said axle 14 is accommodated in the hole 21. Said slot, in the construction illustrated, is normal to the axis of the hole 21.

The transverse or horizontal axle 23 of the castor is firmly secured through the body member 17, with its central axis coincident with the common centre of curvature of the front and rear edge portions 19 of said body member. That axle 23 extends equal distances on opposite sides of the body member, and its outer ends are chamfered—see FIG. 4.

In order that the axle 23 may be firmly secured in position in the body member 17 it is made a force fit in a central hole in the body member and it is provided at about its middle with a circumferential groove or recess 24—see FIG. 4. After the axle 23 has been fitted into the body member 17 pressure is applied to the opposite sides of the body member so as to cause the material thereof to flow slightly and thereby fill that recess, the sides of the body member being concaved to a small extent at 25 in the process.

The axle 23 has a longitudinal slot 26 in its middle portion, the length of the slot 26 being greater than the thickness of the body member 17 so that opposite ends of the slot 26 extend on opposite sides of said body member. A second hole 27 is provided in the body member, substantially parallel to the hole 21, and its lower end is in direct communication with that slot 26. There is thus provided a means for feeding lubricant to the axle 23—down the hole 27 and along the slot 26 to the two sides of the axle.

Immediately in front of and slightly below the axle 23 are two projections 28, one on each side of the body member 17. These projections 28 are substantially cylindrical in shape and they are axially aligned and each has in its upper portion a slot 29 parallel to and spaced a short distance outwardly of the sides of the body member.

Each of the castor wheels 30 is made substantially hemispherical in shape and of shell-like construction with a central, radial hub 31 adapted to fit on the transverse axle 23. A number of ribs 32—as four—extend between the hub 31 and the inner surface of the shell-like hemispherical castor wheel to provide for a desired strength of construction. Near the inner end of the hub 31 of each wheel 30 is a circumferential groove 33 which, when the wheel 30 is mounted on the transverse axle 23 and the inner end of the hub 31 is against or close to the body member, is spaced the same distance from that side of the body member as the slot 29 in the relevant projection 28.

On its outer surface each of the castor wheels 30 has a circular tread part 34 which is cylindrical—to provide a relatively flat bearing surface. Consequently, the outer surface of each castor wheel 30 is not strictly hemispherical though, as stated above, it is substantially hemispherical.

The locking member 35 has a top plate 36 and two side arms or wings 377. The top plate 36 is adapted to fit neatly but slidably in the transverse slot 22 in the body member 17 and in its rear end portion there is a recess 38 enlarged at the open end thereof to provide shoulders 39. The front end portion of the plate 36 constitutes a finger piece. The two side arms 37 extend downwardly from the top plate 36 and they are spaced apart a distance equal to the distance apart of the slots 29 in the two projections 28. The lengths of the arms 37 are such that when the top plate 36 is engaged in the transverse slot 22 the lower ends of the arms 34 will engage in those slots 29 so as to be capable of fore-and-aft movement therein.

The inner portion of the recess 38 in the top plate 36 is of a width slightly greater than the diameter of the groove 16, so that the edge of that part of the recess 38 can engage in the groove 16, and the enlarged open end of the recess 38 is of a width slightly greater than the thickness of the major part of the body member 17 so that the inner end of the top plate is adapted to fit on opposite sides of the body member when the locking member is firmly in its locking position. As the circumferential groove 16 of the upright axle 14 registers with the transverse slot 22 when the parts are fitted together, as the grooves 33 near the inner ends of the hubs 31 of the castor wheels 30 are in line with the slots 39 in the projections 28 when the castor wheels 30 are fitted on the horizontal axis 23, and as the grooves 16 and 33 are the same widths as the slots 22 and 29, the locking member 35 is adapted to engage in the grooves 16 and 33 so as to hold the several parts of the castor in assembled relationship—the edge of the material of the locking member 35 about the recess 38 engaging in the groove 16 of the upright axle (see FIG. 4) to prevent disengagement of that axle from the body member 17, and the rear edges of the side arms or wings 37 engaging in the circumferential grooves 33 of the hubs 31 (see FIG. 3) to prevent disengagement of the castor wheels 30 from the transverse or horizontal axle 23.

When the locking member 35 is pressed inwardly (rearwardly) in the slot 22 the shoulders 39 make contact with the inner end of the slot 22 to limit the inward movement of the locking member and thereby prevent the rear edges of the arms or wings 37 pressing upon the bottoms of the grooves 33. The engagement of the side arms 37 in the slots 29 assists in holding the locking member 35 against sideways movement.

When the locking member 35 is properly in position the front or outer end of the top plate 36 extends outwardly a short distance to provide means whereby the locking member may be withdrawn from its locking engagement with the axle 15 and castor wheels 30 if so desired.

In the construction illustrated in the drawings the slot 22 in the body member 17 is substantially horizontal when the castor is in the normal operating position. However, if desired, the slot 22 may be inclined rearwardly and downwardly so as to reduce the likelihood of the locking member 35 becoming disengaged inadvertently from the body member 17. Alternatively, the locking member 36 may be formed with a small projection—as a shallow rib—so that when it is pressed firmly into the slot 22 the projection will ensure that the locking member fits very tightly in the slot 22. Also, the upright axle 14 and the plate 11 may be formed integrally, as may be the body member 17 and the transverse axle 23. If the member 17 and axle 23 be made as a unit the means for effecting lubrication may be a small hole through the axle 23 and a hole through the body member 17 communicating with the hole through the axle 23. The mounting plate 11 may be made any suitable design—to suit the articles of furniture to which the castor is to be fitted.

All such modifications as come within the broad scope of the invention as herein described are to be deemed to be included in the ambit of the invention.

What I claim is:

1. A castor having a body member, a transverse axle extending on opposite sides of said body member, at least two castor wheels rotatably mounted on said transverse axle on opposite sides of said body member, an upstanding axle, said body member having an opening therein, for rotatably receiving the lower end portion of said upstanding axle, and a locking member carried by said body member and operatively engaging both said upstanding axle and said castor wheels to restrain axial movement of said wheels and said upstanding axle with reference to said body member.

2. The structure of claim 1 in which said locking member comprises a locking plate having a pair of spaced side arms disposed on opposite sides of said body member, said plate engaging said upstanding axle to prevent relative axial movement thereof and said side arms engaging said castor wheels to maintain the same upon said transverse axle.

3. The structure of claim 1 in which said locking member is slidably carried by said body member for movement between a locking position and an unlocking position for locking and unlocking said wheels and said upstanding axle against axial movement relative to said body member.

4. A castor having a body member, a transverse axle extending on opposite sides of said body member, a pair of castor wheels rotatably mounted on said transverse axle on opposite sides of said body member, each of said castor wheels having a central hub provided with a circumferential groove, an upstanding axle having a groove extending circumferentially thereabout, said body member having an opening therein for rotatably receiving said upstanding axle, and a locking member carried by said body member and having portions thereof projecting into the grooves of both said upstanding axle and said castor wheels for restraining axial movement of said wheels and said upstanding axle with reference to said body member.

5. The structure of claim 4 in which said locking member comprises a locking plate having a pair of spaced side arms disposed on opposite sides of said body member, said plate having a portion thereof received within the groove of said upstanding axle to prevent axial movement of the same with reference to said body member, said side arms each having a portion thereof received within a groove of one of said castor wheels for maintaining the same upon said transverse axle.

6. The structure of claim 4 in which said locking member is movably carried by said body member for movement between a locking position and an unlocking position for locking and unlocking said wheels and said upstanding axle against axial movement relative to said body member.

7. The structure of claim 6 in which said body member is provided with a slot, said locking member having the locking plate thereof slidably received within said slot for movement of said locking member between said locking and unlocking positions.

References Cited in the file of this patent

UNITED STATES PATENTS

| | | |
|---|---|---|
| 440,875 | Clark | Nov. 18, 1890 |
| 627,730 | Haferkorn | June 27, 1899 |
| 2,539,108 | Shepherd | Jan. 23, 1951 |

FOREIGN PATENTS

| | | |
|---|---|---|
| 26,753 | Great Britain | Dec. 19, 1898 |
| 139,685 | Australia | Dec. 11, 1950 |